United States Patent
Watanabe et al.

(10) Patent No.: US 6,201,655 B1
(45) Date of Patent: Mar. 13, 2001

(54) ROTATIONAL STORAGE DEVICE

(75) Inventors: Mitsunobu Watanabe, Kamakura; Tsuneo Hirose; Atsushi Takayasu, both of Odawara; Yuji Yamane; Yusuke Mizuno, both of Hiratsuka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/154,841

(22) Filed: Sep. 17, 1998

(30) Foreign Application Priority Data

Sep. 19, 1997 (JP) .................................................. 9-254656

(51) Int. Cl.[7] ...................................................... G11B 5/09
(52) U.S. Cl. .................................................. 360/53; 360/48
(58) Field of Search ........................... 360/48, 53; 369/53

(56) References Cited

U.S. PATENT DOCUMENTS

| | | | |
|---|---|---|---|
| 5,357,381 | * 10/1994 | Yasuda et al. | 360/53 |
| 5,450,251 | * 9/1995 | Kitagawa | 360/53 |
| 5,822,142 | * 10/1998 | Hicken | 360/53 |
| 5,995,308 | * 11/1999 | Assouad et al. | 360/48 |
| 6,025,966 | * 2/2000 | Nemazie et al. | 360/53 |

FOREIGN PATENT DOCUMENTS 5-282794   10/1993   (JP) .

* cited by examiner

*Primary Examiner*—W. Chris Kim
(74) *Attorney, Agent, or Firm*—Mattingly, Stanger & Malur, P.C.

(57) ABSTRACT

A magnetic disk drive has magnetic disks having tracks and a number of sectors forming each track. The tracks have an ID few track format and the drive is divided into a plurality of notches. The drive also includes a memory and a defect sector list, sector replacement list, defect track list and replacement track list, each of which is stored in the memory. Defective sectors and tracks in each notch are slipped during formatting, and further defective sectors and tracks detected subsequent to the formatting are skipped. Spare sectors in the notch are provided in a spare region to accommodate the slipped and skipped sectors and tracks, respectively. The defective sector list is supervised as a two stage table to reduce the required memory size for maintaining the list and to decrease the time required for searching the list.

25 Claims, 7 Drawing Sheets

DEFECT LIST

| ENTRY NO. | CYLINDER ADDRESS (2 BYTES) | HEAD ADDRESS (1 BYTE) | SECTOR ADDRESS (1 BYTE) |
|---|---|---|---|
| 0 | 1 | 5 | 13 |
| 1 | 1 | 7 | 35 |
| 59 | 10 | 5 | 39 |
| 60 | 10 | 5 | 45 |
| 61 | 10 | 6 | 38 |
| 62 | 10 | 7 | 1 |
| 63 | 11 | 2 | 22 |
| 64 | 11 | | |
| 29999 | 4990 | 2 | 34 |
| 30000 | 4995 | 9 | 22 |

*FIG. 6*

DEFECT LIST IN TWO STAGE TABLE

FIRST STAGE, POINTER FOR EACH CYLINDER

| CYLINDER NO. | POINTER |
|---|---|
| 0 | 0 |
| 1 | 0 |
| 8 | 45 |
| 9 | 58 |
| 10 | 59 |
| 11 | 63 |
| 12 | 70 |
| 4496 | 29860 |
| 4997 | 29880 |
| 4998 | 29990 |
| 4999 | 29995 |

2 BYTES

SECOND STAGE, DEFECT ADDRESS (HEAD & SECTOR)

| ENTRY NO. | HEAD NO. | SECTOR NO. |
|---|---|---|
| 0 | 5 | 13 |
| 1 | 7 | 35 |
| 58 | 3 | 14 |
| 59 | 5 | 39 |
| 60 | 5 | 45 |
| 61 | 6 | 38 |
| 62 | 7 | 1 |
| 63 | 2 | 22 |
| 29993 | | |
| 29994 | | |
| 29995 | | |
| 29996 | | |
| 29998 | | |
| 29999 | | |

1 BYTE  1 BYTE

*FIG. 7*

ROTATIONAL STORAGE DEVICE

FIELD OF THE INVENTION

The present invention relates to data formatting in a storage device, and in particular to a magnetic disk storage device of an ID less (or ID Few) system, and further to a procedure using spare sectors to replace bad sectors in a magnetic disk storage device.

BACKGROUND OF THE INVENTION

A conventional magnetic disk storage device has a system in which ID information is provided for storing position information and replacement information for each sector. In a Read/Write process, the sectors that are already replaced are skipped by referring to the ID information. In this procedure, as mentioned in unexamined patent publication JP 05-282794 (Japan), for example, the information of how many sectors the true sector has slipped due to bad sectors is supervised in the ID information, and it is required that the true target sector be re-accessed after reading the ID information by using the physical address which is converted from a logical address. In this case, if many slipped sectors exist, there exists a high probability that the target might be slipped to the next track. Therefore, spare sectors are supervised in units of a track or cylinder. If the spare sectors were supervised in expanded zone units (a unit having a spare sector is called a zone), the performance would deteriorate due to the requirement of reissuing the seek command.

In another example of the prior art, used in a SCSI interface, a mode sense command is provided to verify a spare region unit from an upper host computer. Since a unit of a spare region is less than one track in the case of track/cylinder zone replacement, a bad track is replaced (jumped) to a dedicated track in the replacement of the bad track.

SUMMARY OF THE INVENTION

The conventional technology has a problem that the format efficiency (the ratio of data area a user can actually use to the total data area: effective storage capacity) deteriorates because more spare sectors are required than the average number of bad sectors that exist in a whole drive, since the drive requires spare sectors for every track or cylinder.

Further the conventional technology has a problem that performance severely deteriorates due to additional seek (requiring additional disk rotation), and if bad sectors concentrate in a certain zone, a "skip sector" replacing procedure in which the sector is skipped to another zone is required, or a replacement of the concerned track as a bad track is required.

Moreover, the conventional technology has a problem that performance and format efficiency deteriorate due to the use of a "skip track" replacing procedure in which the bad track is jumped to a dedicated alternative track.

An object of the invention is to offer a replacement procedure using a "slip sector" method which secures data continuity, by preparing a spare region in a magnetic disk storage device per notch, which has a different capacity than that of a track, or per volume, and slipping all of the bad sectors at the formatting. This reduces the size of the spare region required for sector replacement or track replacement.

Another object of the invention is to reduce the memory capacity requirements and to prevent substantial increase in processing time due to searching for a bad sector list, although the list is required to be resident in the memory.

The purpose mentioned above is accomplished by supervising the locations of a "slip sector, a "skip sector", a "slip track", and a "skip track" in a map through preparation of a spare region for each notch (or per disk unit volume) and by sharing the spare region. The number of sectors the target sector has been slipped is counted by a defect list (bad sector list) after replacement has been executed. In the formatting of the storage device, all of the bad sectors are made into slip sectors by utilizing the spare region.

Further, a "slip track" method is used in which valid tracks are slipped in order, to avoid excessive seek or excessive rotational latency when a bad track is detected, because a spare region for several tracks is secured owing to the expansion of the unit in which the spare region is provided.

Another object of the invention is accomplished by providing a two stage table for the defect sector list that is stored in memory. The two stage table has a first stage table that stores a pointer using a unit of the upper address (cylinder address, for example) that points to the lower address of the defective sector entry in the list that is stored or supervised in the second stage table.

Thus, an increase in searching time is prevented by searching only the table in the first stage of the two stage table which supervises the upper address, and by identifying the target track by counting the number of slipped sectors due to bad sectors in front of the concerned address (cylinder for example).

BRIEF DESCRIPTION OF THE DRAWINGS

FIG. 6 is a conventional defect sector list.

FIG. 7 is a drawing showing a defect sector list embodied according to the present invention.

DETAILED DESCRIPTION OF THE PREFERRED EMBODIMENTS

Figure 1:
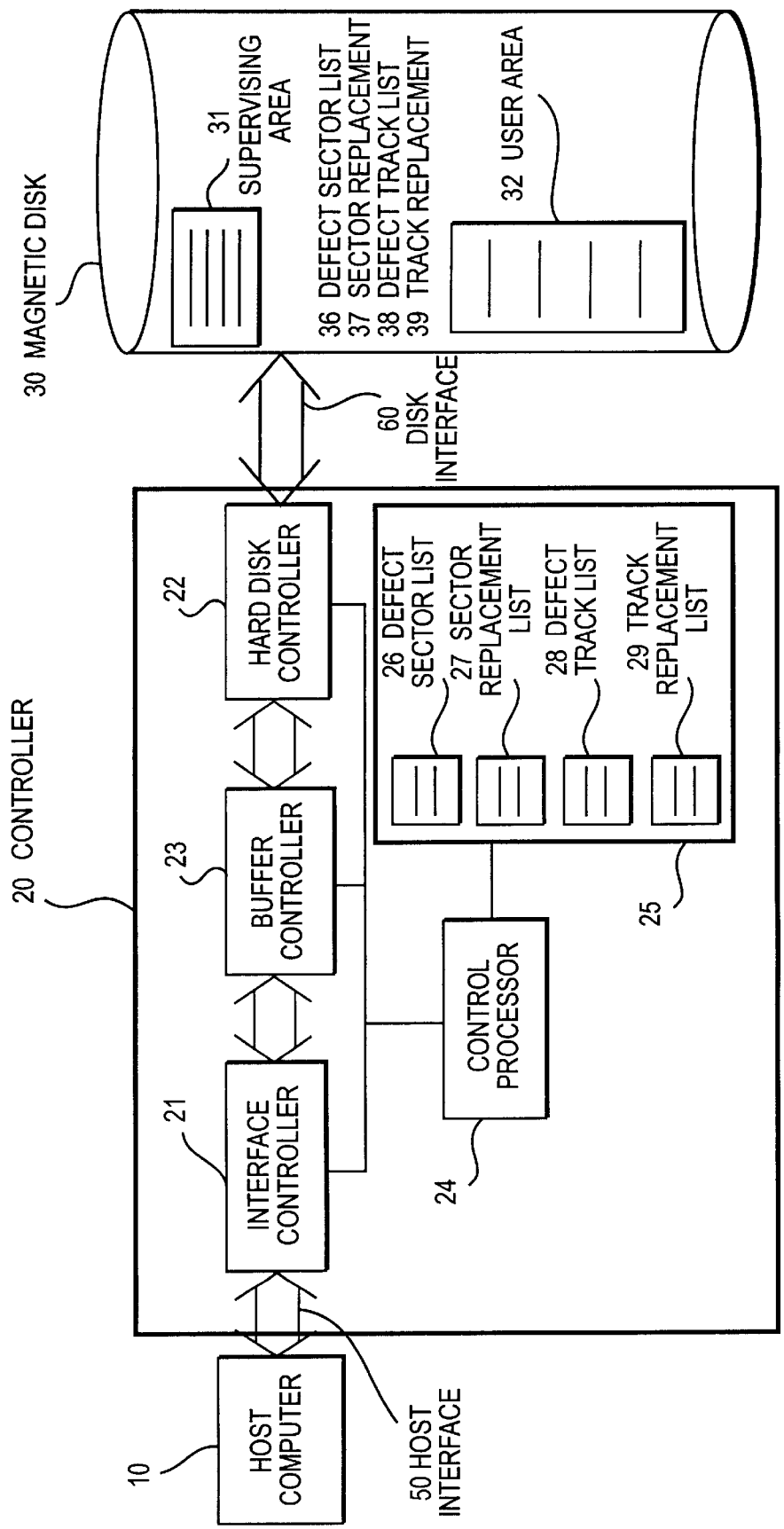
FIG. 1 is a drawing showing an arrangement of a magnetic disk storage device in the present invention.

Details of the present invention are explained with reference to a preferred embodiment shown in the drawings. FIG. 1 shows a block diagram of an embodiment of a magnetic disk control device adopting the present invention.

FIG. 1 shows a host computer 10 and a control device 20 that are connected to each other through a host interface 50. A magnetic disk storage 30 is connected to the controller 20 through a disk interface 60.

The controller 20 has an interface controller 21 that controls data transfer with the host computer 10, a hard disk controller 22 that controls data transfer with the magnetic disk storage 30, a buffer controller 23 for controlling internal data transfer, a control processor 24 connected to the interface controller 21, buffer controller 23 and hard disk controller 22. Also, controller 20 has an internal volatile memory 25 for storing control information.

The magnetic disk storage device 30, hereinafter magnetic disk 30, includes a supervising area 31 in which is stored the defect sector list, etc. and a user area 32, which is used by a user as a data area.

Figure 2:
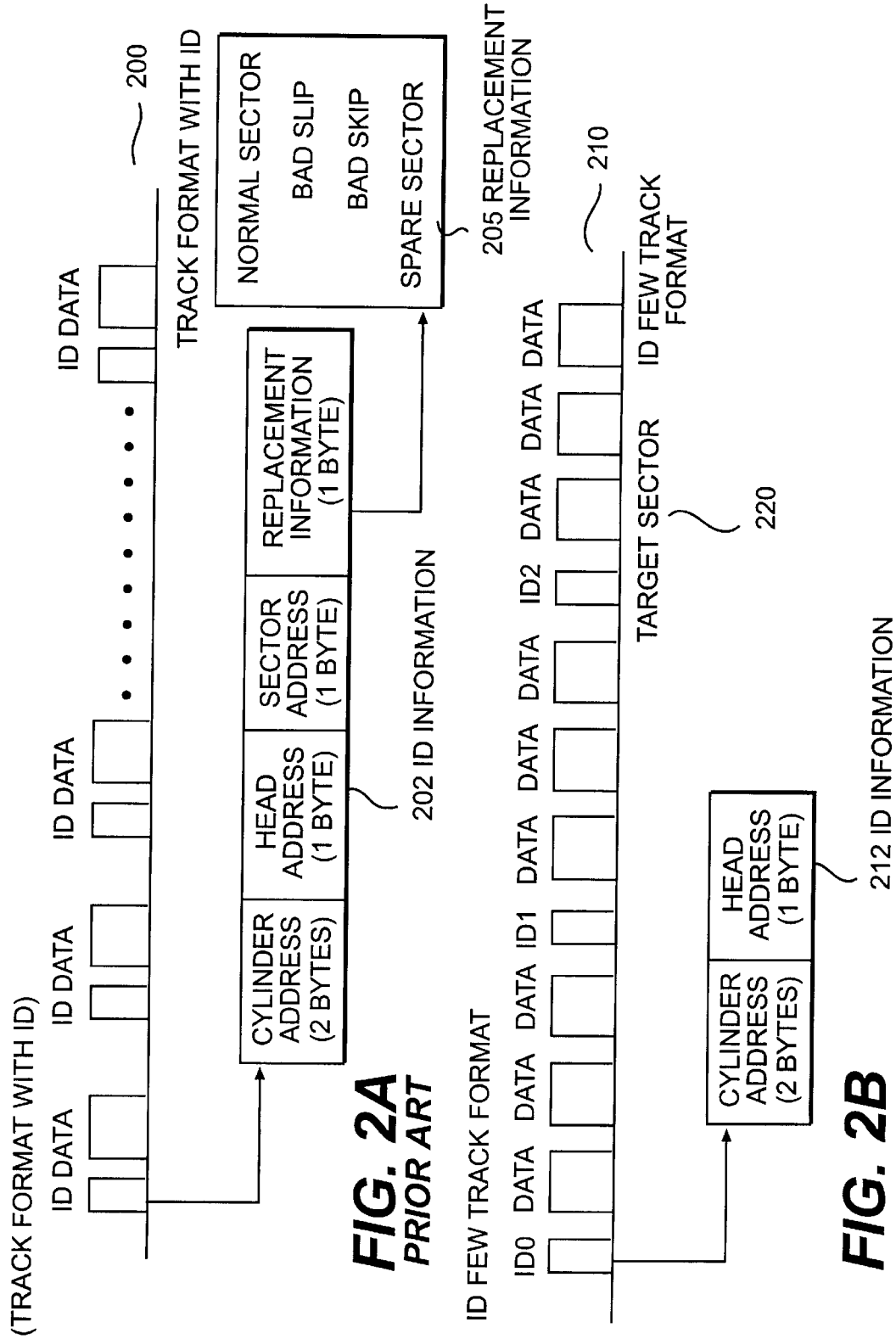
FIG. 2A is a drawing explaining a track format of a magnetic disk storage device.
FIG. 2B is a drawing explaining another track format of a magnetic disk storage device in the present invention.

FIG. 2A shows an example of a disk format with IDs and FIG. 2B shows an ID Few format respectively used in each track of the user area 32. In a conventional format with IDs 200, ID information 202 contains replacement information 205 indicating whether a particular sector is a bad sector etc., and thus making it possible to determine whether a sector is a normal sector, a bad sector ("slip sector"), a bad sector ("skip sector") or a spare sector.

Figures 3, 4:
FIG. 3 is a drawing explaining a conventional track zone replacement system in a magnetic disk storage device.
FIG. 4 is a drawing explaining a conventional cylinder zone replacement system in a magnetic disk storage device.

FIGS. 3 and 4 show examples of the format used in user area 32. FIG. 3 shows track zone replacement and FIG. 4 shows cylinder zone replacement in a conventional system. In FIG. 3, logical sectors 0 to 5 and a spare sector form a line 300. In line 300, there are no bad sectors. In line 301, sector 2 is a bad sector and as a result of a "slip sector" replacing procedure, the sectors following bad sector 2 are slipped in order and the spare sector originally provided as a spare at the end of line 301 is used as a result. In this case, the "slip sector", which is the bad sector 2, contains replacement information in the ID information so that during a read/write process, the hard disk controller automatically skips the bad sector (sector 2).

Further, as shown in line 302 in FIG. 3, if sector 4 is a bad sector, in addition to sector 2 being a bad sector, the number of bad sectors in the zone exceeds the number of spare sectors and another zone must be used. Then, the ID information of sector 4 is treated as a "skip sector", which is registered in the sector replacement list 27 with the target address of the replacement sector. If more than a specified number of bad sectors exist or the magnetic head cannot be positioned on a specified track due to bad spots existing in the seek position information for the specified track (servo information), a dedicated track is assigned as a replacement for the specified track, which is then treated as the bad track. In this case, the bad track (origin of replacement) and destination track are registered in the replacement list 29. For a bad sector (skip sector), the destination sector is accessed according to the sector replacement list stored in internal memory 25. The sector replacement list 27 and the track replacement list 29 are stored in a supervising area 31 in the magnetic disk storage 30, and are loaded in the internal memory 25 when booting up the system device. If a bad sector (slip sector) exists in the case of a track zone replacement, sequential access is possible by slipping a number of sectors in order.

Figure 5:
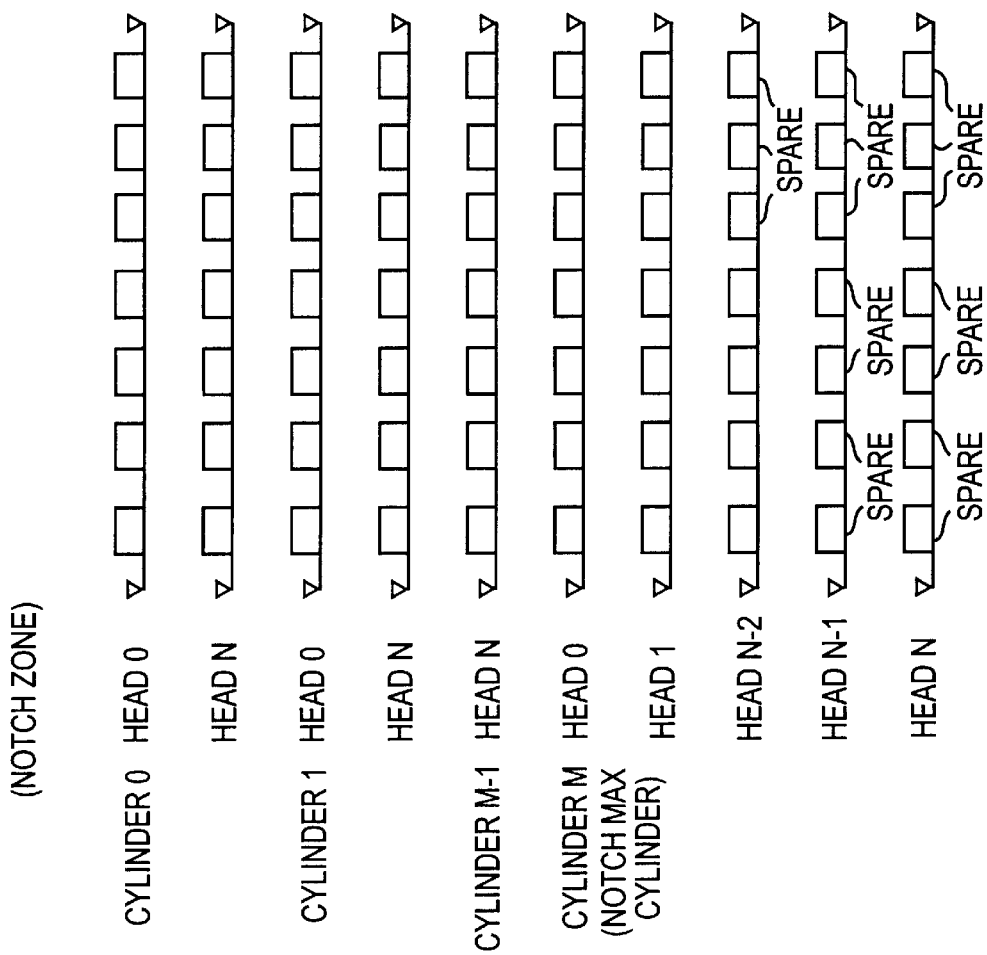
FIG. 5 is a drawing explaining a notch zone replacement system of the present invention.

As sectors are slipped in order from the previous track in a cylinder zone replacement system as shown in FIG. 4, the number of sectors in front of the sector that is slipped is stored in the ID information. Therefore a process to change the sector to be accessed is required after the ID information is read. If a notch zone replacement system that has one spare region per notch, as shown in FIG. 5, is to be realized in a conventional system, there may exist many sectors which have slipped from previous tracks resulting in a high probability that the actual sector does not exist on the track first accessed. Therefore, a notch zone replacement method has not been yet realized wherein a spare region is provided for every notch, because it severely deteriorates the performance due to the associated need for re-seek resulting from the replacement. For example, if there exists an average of 200 bad sectors per notch and the number of sectors in a track is 100, tracks that are simply converted to physical addresses might slip off from the actual tracks in a probability of 3/4, thus requiring re-seek.

An ID less system that entirely removes the IDs is different from the conventional format shown in FIG. 2A with IDs 200, and has been devised for the purpose of improving formatting efficiency. An ID Few format 210, which is different from the ID less system, has an ID every several sectors, not per sector, as shown in FIG. 2B. The ID Few format system has been used to secure reliability. Namely, the ID is not used for conventional position information per sector, but for information to confirm the track positioning, i.e. ID 212 is used to confirm the positioning to the target track in Read/Write. Therefore, ID information 212 in the ID Few system contains only a cylinder address and a head address. Consequently, in the ID less (and ID Few) system, information of bad sectors (slip sectors) or such cannot be supervised because ID information does not exist for each sector. So, a list of all of the defective sectors 26 must be stored in the internal memory 25.

A notch zone replacement system is realized using the defective sector list 26 which is stored in the internal memory 25. Namely, the address to be accessed is corrected by counting the number (number that is slipped by bad sectors) of bad sectors (slip sectors) up to the target sector using the defective sector list 26 stored in the memory. For example, suppose the number of cylinders in a magnetic disk storage device 30 is 5,000, the number of heads is 10, and the number of sectors per track is 50. For the original address of cylinder 10, head 5, and sector 40, the actually accessed address is cylinder 10, head 7, and sector 2 in the case that bad sectors such as those listed in the defective sector list shown in FIG. 6. In this case, the number of bad sectors up to the original target sector is not simply counted, but rather the number of bad sectors in slipped sectors must be counted. Namely, the number of bad sectors up to cylinder 10, head 5, and sector 40 is first counted. The address at the center of the defective sector list is compared to the address to be addressed, and if the address to be addressed is smaller, the upper half is divided into two (divide by two search logic) and the number of bad sectors ("slip sector") up to the target sector is counted as 59.

Next, correction (addition) by a count 59 to cylinder 10, head 5, and sector 40 results in cylinder 10, head 6, and sector 49 (correction address 1). Here, the number of bad sectors are counted (2 sectors) from the original address to correction address 1, then correction (adding) by 2 results in cylinder 10, head 7, and sector 1 (correction address 2). Again, a similar process is repeated, obtaining final correction address 3 of cylinder 10, head 7, and sector 2. As above mentioned, since the defect list after replacement is resident in the memory to improve format efficiency and the number of sectors the target sector has slipped are counted, it is possible to have a spare region per notch (a region which has a different capacity than a track). This secures data succession and a minimum of excessive seek or rotational latency. This can be performed at the factory prior to shipment or in a re-formatting process performed by the user, by slipping all of the bad sectors ("slip sector") during the formatting. A spare region can also be prepared for a whole drive (i.e. by volume), although a notch zone replacement system that has a spare region per notch has been explained as the preferred embodiment.

In the case of an SCSI interface, the format information can be verified by the host computer 10 using a mode parameter when a notch zone replacement is executed as mentioned above. Namely, the number of tracks per notch is reported in the number of tracks per zone (Tracks per Zone), and a spare region per notch is reported in the number of replacement sectors per zone (Replace Sectors per Zone) as a number of sectors. After formatting, as a means to secure data succession and to report that excessive seek or rotational latency is unlikely to occur, the last address of the notch or the magnetic disk is reported by a PMI (Partial Medium Indicator) of a Read Capacity command. Before formatting, it is also possible to report to the host computer 10 that an excessive seek or rotational latency will not occur. For example, it is also possible to report to the host computer by providing a flag, that the above condition is secured in the Mode Sense command or Inquiry command.

Further, for realizing an ID Few system with an ID per several sectors as shown in FIG. 2B, a criteria can be set as follows: if N bad sectors are in succession on account of the positioning ability of a magnetic disk device, then track replacement is executed; and if N bad sectors are not in succession according to the positioning ability of the magnetic disk device, in other words, if more than one ID is read in the N preceding sectors before a concerned sector, then the track replacement is not executed and the system can read or write. The ID Few system does not adopt a criteria that makes a read/write operation possible if more than one ID is read in one track. Rather, the track is judged as a bad track when N bad sectors are found to exist in succession and track replacement is executed when a bad track is found to exist.

For example, according to a preferred embodiment of the system, the target sector 220 show in FIG. 2B is considered accessible if at least one of ID0, ID1 and ID2 is read, when the sector is to be read or write. To judge whether there is a bad track or not, three successive bad sectors are considered sufficient to declare that the track is bad.

Although a defect sector list 26 must be stored in the internal memory 25 as mentioned above, when a notch zone replacement is executed, allocated memory size in that case is a problem. The number of bad sectors within a whole magnetic disk 30 in the worst case is increasing year by year, as recording density or capacity per drive increases. For example, if a defect sector list of 30,000 entries is to be stored in the internal memory, a memory of 120 kilo-bytes in total is required since at least an area of four bytes, two bytes for a cylinder address, one byte for a head address and one byte for a sector address, is required for each list entry. This causes a problem of increased cost due to the need for additional memory capacity. Further, this system also has a problem that the time to search for the defect sector list increases due to repetition of the divided by two search logic mentioned above to calculate the actual address for the target sector.

FIG. 7 shows a two stage table for supervising the defect sector list that solves this problem. The two stage table uses a first stage table to supervise the pointer of the defect address which is supervised for each cylinder and a second stage table for the defect address, including head address and sector address. Namely, The table shown in FIG. 6 is modified to a two stage table as shown in FIG. 7.

This system requires an area in the first stage table for every cylinder to store the pointer of the defect table. In the above case of 30,000 bad sectors, the first stage table requires a memory of 5,000 cylinders×2 bytes=10 kilo-bytes, if two bytes are prepared per cylinder because a memory of 15 bits to express 30,000 items for every cylinder is required. Further, the second stage table requires a memory of 30,000 items×2 bytes=50 kilo-bytes to supervise 30,000 bad sectors because the second stage table supervises only a head address and a sector address (2 bytes). The table requires 70 kilo-bytes in total. Accordingly, the required memory is reduced from 120 kilo-bytes to 70 kilo-bytes by using a two stage table, resulting in memory reduction.

Although the first stage of the two stage defect table is based in units of cylinders in this embodiment, other methods are possible as long as the upper address is supervised, for example the upper half of the LBA (Logical Block Address). By using this system, the required memory can be reduced by supervising the pointers in the first stage table of the defect list using each upper address (cylinder address, for example), and by supervising the lower address in the defect list in the second stage table, when a bad sector list is stored to the memory in a magnetic disk storage device using an ID less (or ID Few) format.

It is also possible to shorten the searching time by using a two stage table in the present invention. Namely, the number of bad sectors up to a previous cylinder can be immediately obtained from the first stage table, and the address to issue for the seek command can be obtained. Although the target address may be slipped off due to a bad sector in the cylinder as a worst case, a deterioration of performance using the notch zone replacement system in an ID less (or ID Few) format may be prevented by calculating the target address by the number of bad sectors up to the previous cylinder obtained from the first stage table, by executing the seek, and by calculating the exact address during the seek operation because the probability of slipping off is quite low.

Next, a track replacement method will be explained. Although a sector replacement process as mentioned above is executed in the case of a bad sector being found in a track unit, a track replacement must be executed when a bad track is determined to exist due to bad sequential IDs and when a magnetic head cannot be positioned to the concerned track due to defect(s) in the servo information. For the case where the head cannot be positioned to the track, the internal memory 25 is required to have a bad track list because bad tracks are not recognized by ID information.

In the track zone replacement and cylinder zone replacement of a conventional system, a dedicated region for track replacement is prepared because the spare region, is generally less than one track. If a bad track were to be supervised by skipping the bad track to the spare track ("skip track"), excessive seek operation and rotational latency is likely to occur when the concerned track is accessed.

In a notch zone replacement system according to the invention, when a bad track has occurred, the assigned track is slipped to the next, and the succeeding tracks are slipped in turn up to the last tracks of the notch, utilizing the spare region of several tracks at the end of the notch. The actual address is calculated by correcting for the number of tracks registered in the defect track list ("skip track") 28 after which a logical address is converted to a physical address. By using this method, useless seek or rotational latency will not occur even if bad tracks exist.

The replacement method for bad sectors and for bad tracks in formatting has been shown above. This secures data succession as a result of formatting at the factory or as a result of reformatting by a user, realizing a replacement process that causes no excessive seek or rotational latency even if bad sectors or bad tracks exist.

On the contrary, data must be preserved if a bad sector occurs when the magnetic disk storage device is operating as an external storage device. If a "slip track" is executed in a unit of a notch, it might take a long time for coping the data, resulting in a time-out error in the host computer 10, and an actual slip process cannot be executed in some cases. Accordingly, bad sectors/tracks which occur after formatting must be exchanged (skip replacement) for spare sectors or spare tracks for replacement in the spare region.

Such skip replacements are stored in a sector replacement list 27 and a track replacement list 29 in the internal memory 25, as shown in FIG. 1. The sector replacement list 27 and the track replacement list 29 show the addresses of the origin of the replacement and the destination of the replacement. In the read/write process, the sector requested by the host computer 10 is searched in the sector replacement list 27 and the track replacement list 29, and if the target sector or the target track is registered as a bad sector ("skip sector") or a bad track ("skip track"), the replaced sector or replaced track is accessed.

In a conventional magnetic disk storage device, the spare region for slip sectors was within one half of the track size, because of the track zone replacement or cylinder zone replacement method. Accordingly, spare sectors and spare tracks which are assigned as replacement destinations, cannot be shared and controlled as separate regions and the worst case sized spare region area for replacement sectors and tracks is required to be secured. In the present invention, on the other hand, improvements in format efficiency are realized by minimizing the area of the spare region, which has the size of several tracks per notch, and in which a spare region for slip sectors, a spare region for slip tracks, a spare region for skip sectors, and a spare region for skip tracks are all controlled to exist at the end of the notch.

Figure 8:
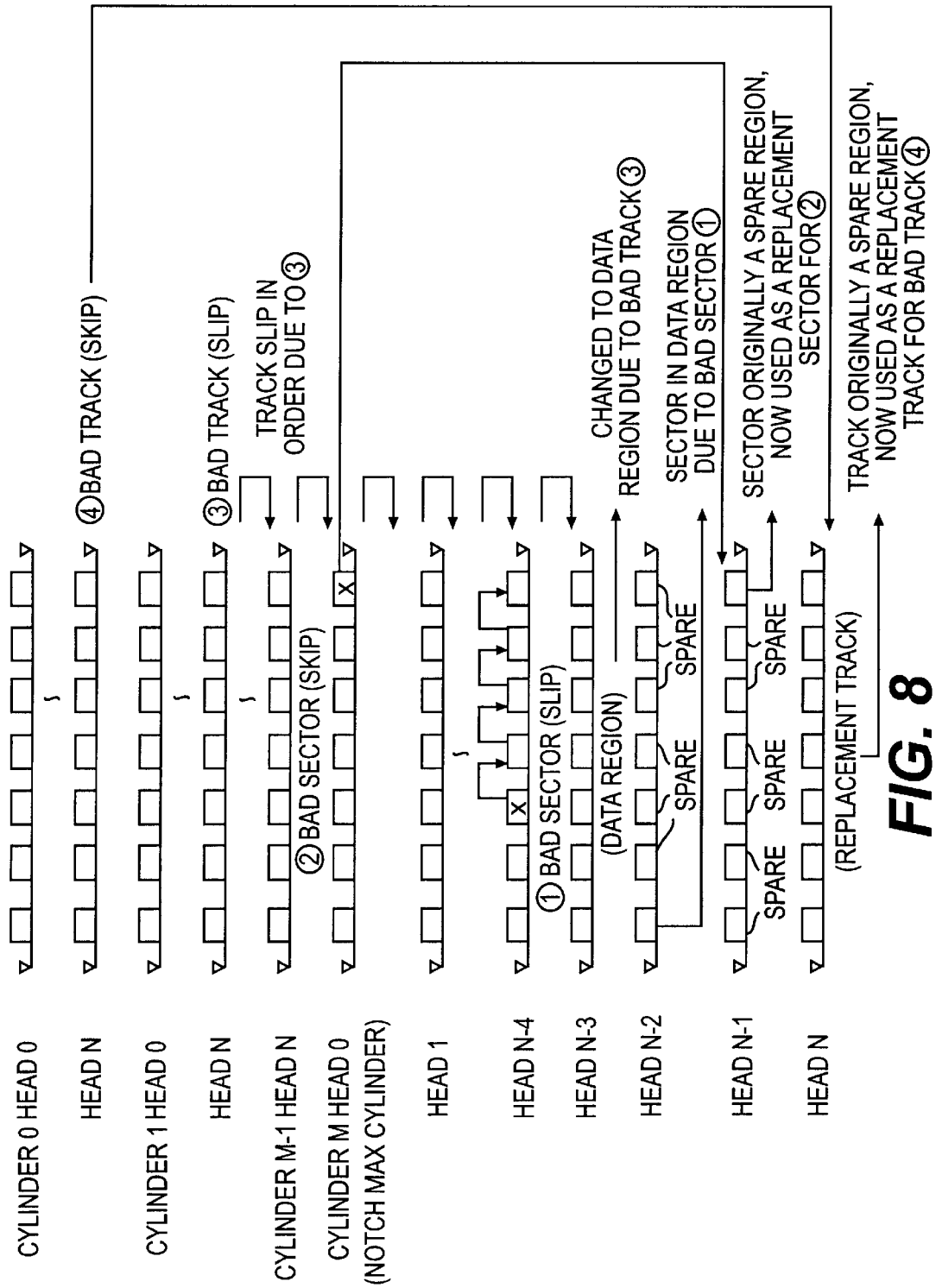
FIG. 8 is a drawing explaining a notch zone replacement system according to the present invention.

FIG. 8 shows one notch in a rotational storage device having one or more disks. As a typical example, the drive has 2–15 disks with 16–18 notches per drive or 20–22 notches per drive. For each disk, there are 200 sectors per track and 300 tracks, so one notch equals 300×200 (60,000) sectors. For each notch, beginning with cylinder 0, head 0 through cylinder M, head N, there are a group of tracks at the end of the notch, for example at cylinder M (the maximum cylinder addressed in the notch), shown at addresses: head N−3 to head N as shown in FIG. 8, that includes a group of spare sectors that are to be used for bad sectors in the group of tracks.

Namely, as shown in FIG. 8, the notch is divided into a data region (cylinders 0 to cylinder M) and a spare region (shown at addresses: head N−3 to N). When a bad track (3) is detected in the manufacturing stage at the factory, tracks following the concerned track are slipped in order ("slip track"), using the top track of the spare region in the notch zone during formatting. When a bad sector (1) is detected, sectors following the concerned sector are slipped in order ("slip sector"), using the top sector of the spare region available in the notch. If a bad track (4) is detected later (when used by a user), the last track of the spare region in the notch zone is used as a replacement track ("skip track"). If a bad sector (2) is detected later (when used by a user), the last sector of the spare region in the notch zone is used as a replacement sector ("skip sector").

Although in this embodiment, the spare region is used starting from the end of the spare region for skip sectors and skip tracks, it can be used starting from the beginning. This method makes it possible to improve the format efficiency by sharing the spare region for slip sectors, skip sectors, slip tracks and skip tracks.

Figure 9:
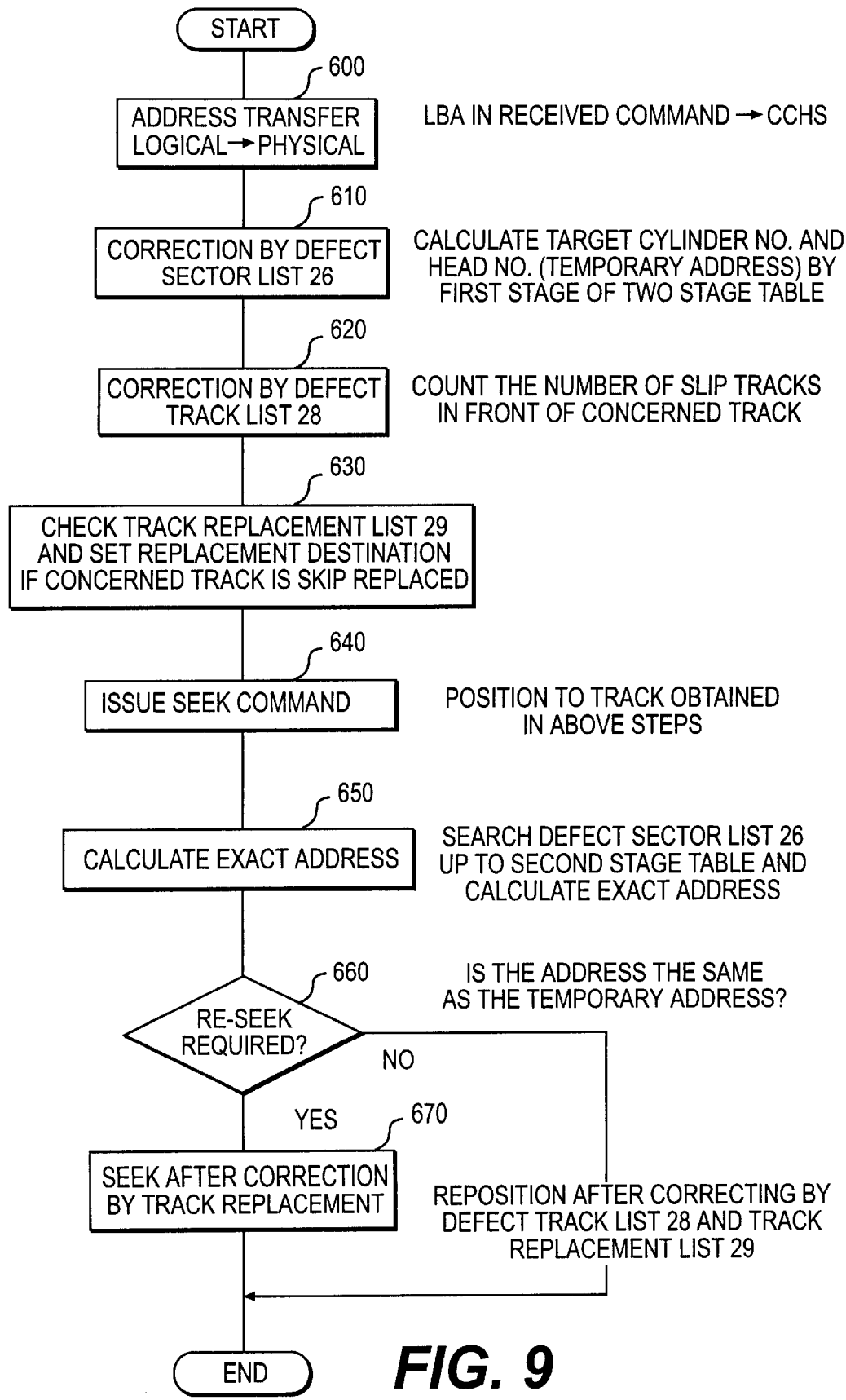
FIG. 9 is a flow chart showing a procedure followed in response to a seek command issued in a read/write process in a magnetic disk storage device according to the present invention.

Next, the procedure of the read/write process from the host computer 10 in the magnetic disk storage device which practices the above replacement is explained using FIG. 9. First, as a read/write command is received from the host, a logical address (LBA: Logical Block Address) is extracted from the received command and is converted to a physical address (CCHS: cylinder address, head address and sector address).

Next, the target cylinder number and head number (temporary address) is calculated by the first stage of the two stage defect table in the defect sector list 26 (610). Then, a number of slip tracks in front of the concerned track is counted by the defect track list 28, correcting the target seek address by a number of registered slip tracks (620). Then, the track obtained in step 620 is checked to determine whether it is registered on the track replacement list 29 or not. If it is registered, the replacement destination is assigned as a target seek address (630). After seek positioning to the track obtained in step 630 is completed (640), the target sector is calculated again by the defect sector list 26 during the seek operation (650). This time, an exact address is calculated by both tables of the two stage defect table. If the exact address is slipped off from the track address issued first (660), a correction by the defect track list 28 and the track replacement list 29 is done, and the seek operation is re-issued (670).

A defect list (bad sector list) after replacement has been executed is stored by the above method. Data succession is secured by the "slip sector" method which counts how many sectors the target sector slipped and then slips all of the bad sectors in the formatting utilizing the spare region, or by a "slip track" method which counts how many tracks the target track slipped and then slips all of the bad tracks in the formatting utilizing the spare region, to thereby improve the format efficiency and performance.

Further, a spare region for several tracks is secured by expanding the unit in which the spare region is provided, i.e. to the size of the notch, thereby avoiding excessive seek or rotational latency when a bad track is detected. It is realized to improve the format efficiency and performance by supervising the slip sectors, skip sectors, slip tracks, and skip tracks as a respective map and sharing the spare region.

The required memory can be reduced by using a two stage defect table which supervises the pointers in the defect list for each upper address (cylinder address, for example) in the first stage table, and supervises the lower address in the defect list in the second stage table. Thus, a bad sector list can be stored for a magnetic disk storage device having an ID less (or ID Few) track format.

Further, an increase in searching time can be prevented by searching only the first stage table which supervises the upper address, by counting the number of slipped sectors due to bad sectors in front of a concerned address (cylinder, for example), and then by specifying the target track.

As explained above, a sector and track replacement system is provided to have a spare region per notch. The defect list is stored in memory and a number of slipped defects can be counted. The format efficiency is improved and excessive seek or excessive rotational latency is minimized by executing a slip track system for bad tracks and by sharing a spare region for the replacement of slip sectors, skip sectors, slip tracks, and skip tracks. Further the required memory size is reduced and the time for a seek command to be issued is reduced by supervising a defect list as a two stage table, according to the present invention.

While preferred embodiments have been set forth with specific details, further embodiments, modifications and variations are contemplated according to the broader aspects of the present invention, all as determined by the spirit and scope of the following claims.

What is claimed is:

1. A rotational storage device having at least one storage medium on which information is stored, the at least one storage medium having tracks and a number of sectors and further having an ID few track format, the ID few track format having IDs at a rate of one ID for two or more sectors, comprising:

said storage device having a spare region providing spare sectors for defective sectors within a group of at least two tracks.

2. The rotational storage device as set forth in claim 1, wherein said group of tracks corresponds to a unit of a notch.

3. The rotational storage device as set forth in claim 1, wherein said group of tracks corresponds to a unit of a logical drive of the rotational storage drive.

4. The rotational storage device as set forth in claim 1, further including a controller for controlling a defective track found during formatting, said controller controlling skipping of said defective track during a read/write operation.

5. A rotational storage device, comprising:

at least one storage medium on which information is stored, the at least one storage medium having tracks and a number of sectors;

an ID few track format, the ID few track format having IDs at a rate of one ID for two or more sectors; and a controller for controlling a defective track found during formatting, the controller controlling skipping of said defective track during a read-write operation;

wherein said storage device has a spare region providing spare sectors for defective sectors within a group of at least two tracks; and said controller judges the track as a defective track when defective IDs occur in succession for a specified number of sectors.

6. The rotational storage device as set forth in claim 1, wherein said rotational storage device is a magnetic disk storage device having at least one magnetic disk as said at least one storage medium.

7. A magnetic disk storage device having at least one magnetic disk on which information is stored, the at least one magnetic disk having tracks and a number of sectors and further having an ID few track format, the ID few track format having IDs at a rate of one ID for two or more sectors, comprising:

at least two of said tracks being grouped together in a zone with a spare region wherein bad sectors and bad tracks in said zone are slipped during formatting, and further wherein bad sectors and bad tracks detected subsequent to the formatting are skipped whereby spare sectors in said zone are provided to accommodate said slipped and said skipped sectors and tracks, respectively.

8. The magnetic disk storage device as set forth in claim 7, further including a memory and a defect sector list stored in said memory, said defect sector list storing entries of bad sectors in said zone.

9. The magnetic disk storage device as set forth in claim 7, further including a plurality of notches, wherein said zone corresponds to a unit of a notch.

10. A magnetic disk storage device, comprising:

at least one magnetic disk on which information is stored, the at least one magnetic disk having tracks and a number of sectors;

an ID few track format, the ID few track format having IDs at a rate of one ID for two or more sectors; and a memory and a defect sector list stored in said memory;

wherein at least two of said tracks being grouped together in a zone with a spare region wherein bad sectors and bad tracks in said zone are slipped during formatting, the bad sectors and the bad tracks detected subsequent to the formatting are skipped wherein spare sectors in said zone are provided to accommodate said slipped and said skipped sectors and tracks, respectively;

said defect sector list storing entries of bad sectors in said zone; and said defect sector list is stored as a two stage table with first and second stage tables, with said first stage table storing upper addresses as pointers to lower addresses of bad sectors stored in said second stage table.

11. The magnetic disk storage device as set forth in claim 10, wherein said upper addresses are cylinder addresses and said pointers point to head and sector addresses as said lower addresses for said bad sectors in said second stage table.

12. The magnetic disk storage device as set forth in claim 7, further including a memory and a defect track list stored in said memory, said defect track list storing entries of bad tracks in said zone and a track replacement list stored in said memory for designating a target seek address as a replacement destination for said bad tracks.

13. The magnetic disk storage device as set forth in claim 7, further including a controller for controlling read/write between a host computer and said at least one magnetic disk, said controller having a memory and a defect sector list stored in said memory, said defect sector list storing entries of bad sectors in said zone.

14. The magnetic disk storage device as set forth in claim 13, wherein said memory further stores a defect track list, the defect track list storing entries of bad tracks in said zone; and wherein said controller corrects the target seek address by number of registered slip tracks stored in the defect track list.

15. The magnetic disk storage device as set forth in claim 13, wherein said memory further includes a sector replacement list for storing target addresses of skipped sectors stored in said spare region.

16. A magnetic disk storage device comprising:

at least one magnetic disk on which information is stored, the at least one magnetic disk having tracks and a number of sectors;

an ID few track format, the ID few track format has IDs at a rate of one ID for two or more sectors; and a controller for controlling read/write between a host computer and said at least one magnetic disk, the controller having a memory and a defect sector list stored in said memory, the defect sector list storing entries of bad sectors in a zone;

wherein at least two of said tracks are grouped together in said zone with a spare region wherein the bad sectors and bad tracks in said zone are slipped during formatting, the bad sectors and the bad tracks detected subsequent to the formatting are skipped whereby spare sectors in said zone are provided to accommodate said slipped and said skipped sectors and tracks, respectively; and said defect sector list being stored in a two-stage table with first and second stage tables, the first stage table storing upper addresses as pointers to lower addresses of said bad sectors, wherein after a logical address is converted to a physical address during read/write, a target cylinder number and head number is calculated using said first stage table.

17. The magnetic disk storage device as set forth in claim 16, wherein said upper addresses are cylinder addresses and said lower addresses stored in said second stage table are head and sector addresses.

18. A magnetic disk storage device comprising:
   at least one magnetic disk on which information is stored, the at least one magnetic disk having tracks and a number of sectors;
   an ID few track format, the ID few track format having IDs at a rate of one ID for two or more sectors; and
   a controller for controlling read/write between a host computer and said at least one magnetic disk, the controller having a memory and a defect sector list stored in said memory, the defect sector list storing entries of bad sectors in a zone;
   wherein said memory further stores a defect track list, the defect track list storing entries of bad tracks in said zone;
   at least two of said tracks being grouped together in said zone with a spare region wherein the bad sectors and bad tracks in said zone are slipped during formatting, the bad sectors and the bad tracks detected subsequent to the formatting are skipped whereby spare sectors in said zone are provided to accommodate said slipped and said skipped sectors and tracks, respectively;
   said defect track list being stored in a two-stage table with first and second stage tables, the first stage table storing upper addresses as pointers to lower addresses of said bad tracks, wherein after a logical address is converted to a physical address during read/write, a target cylinder number and head number is calculated using said first stage table;
   said controller corrects the target seek address by number of registered slip tracks stored in the defect track list; and
   said controller, if the track of the corrected target seek address is registered as said bad track on the defect track list, assigns a replacement track from the track replacement list as said target seek address, and calculates the target sector using information from said defect sector list using both of said first and second stage tables.

19. A magnetic disk storage device connectable to a host computer having a controller and at least one magnetic disk, comprising:
   said at least one magnetic disk being divided into notches and having tracks and a number of sectors in each track, the tracks having an ID Few track format, the ID few track format having IDs at a rate of one ID for two or more sectors; and;
   each of said notches having a spare region and a user data area wherein bad sectors and bad tracks in each of said notches are slipped during formatting and said spare region accommodates said slipped sectors and said slipped tracks, respectively.

20. The magnetic disk storage device according to claim 19, wherein said controller controls read/write of data in said data user area and wherein bad sectors and bad tracks detected during read/write are skip replaced to a corresponding said spare region in each said notch.

21. A magnetic disk storage device connectable to a host computer having a controller and at least one magnetic disk, comprising:
   said at least one magnetic disk being divided into notches and having tracks and a number of sectors in each track, the tracks having an ID Few track format, the ID few track format having IDs at a rate of one ID for two or more sectors;
   said controller for controlling read/write between said host computer and said at least one magnetic disk, the controller having a memory and a defect sector list stored in said memory, the defect sector list storing entries of bad sectors in said notch;
   said defect sector list being stored in a two-stage table with first and second stage tables;
   said first stage table stores upper addresses as pointers to respective lower addresses stored in said second stage table for each of said bad sectors; and
   each of said notches having a spare region and a user data area wherein bad sectors and bad tracks in each of said notches are slipped during formatting and said spare region accommodates said slipped sectors and said slipped tracks, respectively.

22. The magnetic disk storage device as set forth in claim 19, wherein said memory further stores a defect track list, the defect track list storing entries of bad tracks in said notch; and wherein said controller corrects the target seek address by number of registered slip tracks stored in the defect track list.

23. The magnetic disk storage device as set forth in claim 19, wherein said memory further includes a sector replacement list for storing target addresses of skipped sectors stored in said spare region.

24. The magnetic disk storage device according to claim 19, wherein said at least one magnetic disk has cylinders.

25. The magnetic disk storage device according to claim 21, wherein said at least one magnetic disk has cylinders.

* * * * *